United States Patent [19]

Baker

[11] Patent Number: 4,693,873

[45] Date of Patent: Sep. 15, 1987

[54] HCN AND IRON CYANIDE COMPLEX REMOVAL

[75] Inventor: Daniel C. Baker, Houston, Tex.

[73] Assignee: Shell Oil Company, Houston, Tex.

[21] Appl. No.: 814,708

[22] Filed: Dec. 30, 1985

[51] Int. Cl.$^4$ ...................... B01D 45/00; B01D 47/00; C01C 3/00
[52] U.S. Cl. ................................ 423/215.5; 423/210; 423/236; 210/749; 210/751
[58] Field of Search ............ 423/236, 237, 238, 215.5, 423/210 M, 210 R; 210/702, 749, 751

[56] References Cited

U.S. PATENT DOCUMENTS

| | | | |
|---|---|---|---|
| 4,497,784 | 2/1985 | Diaz | 423/236 |
| 4,505,881 | 3/1985 | Diaz | 423/236 |
| 4,572,826 | 2/1986 | Moore | 423/236 |
| 4,624,837 | 11/1986 | Baker | 423/215.5 |

*Primary Examiner*—Gregory A. Heller
*Attorney, Agent, or Firm*—Albert J. Adamcik

[57] ABSTRACT

A process for scrubbing a synthesis gas stream containing residual amounts of iron containing particulate solids and minor amounts of HCN is disclosed, the process being characterized by scrubbing of the synthesis gas with an aqueous reactant solution, and providing for conversion of any iron complex or iron complexes formed during scrubbing by a low temperature conversion step.

2 Claims, No Drawings

HCN AND IRON CYANIDE COMPLEX REMOVAL

BACKGROUND OF THE INVENTION

The presence of residual particulates and hydrogen cyanide in various gas streams, especially synthesis gas streams, complicates removal of additional impurities, e.g, removal of $H_2S$ and/or $CO_2$, and poses problems insofar as product quality is concerned. Additionally, in some synthesis gas streams, the presence of reduced iron in the flyash particulates results in the formation of minor amounts of iron cyanide complexes in solutions employed for scrubbing the synthesis gas. These iron cyanide complexes present disposal problems, since cyanide concentrations of any type in waste disposal streams are severely restricted by environmental authorities.

If the gas stream is scrubbed with sufficient water or aqueous scrubbing solution, e.g., as described by Diaz in U.S. Pat. No. 4,497,784, entitled "Solution Removal of HCN from Gaseous Streams, with hydrolysis of Thiocyanate Formed" issued Feb. 5, 1985; U.S. Pat. No. 4,505,881, entitled "Ammonium Polysulfide Removal of HCN from Gaseous Streams, with Subsequent Production of $NH_3$, $H_2S$ and $CO_2$", issued Mar. 19, 1985; U.S. Pat. No. 4,508,693, entitled "Solution Removal of HCN from Gaseous Streams, with pH Adjustment of Reacted Solution and Hydrolysis of Thiocyanate Formed", issued Apr. 2, 1985; and in U.S. Ser. No. 685,708, filed Dec. 24, 1984 by G. R. Moore, now U.S. Pat. No. 4,572,826 all incorporated herein by reference, the great bulk of the HCN and the remaining particulates will be removed. In the polysulfide treatment, high temperature or acid hydrolysis described therein, the iron cyanide complex or complexes may also be hydrolyzed. However, the high temperature hydrolysis is energy intensive, while the volume of acid employed for hydrolysis represents significant additional raw material cost. Particularly in the case where the thiocyanate content of the mixture produced is low, a procedure which provided lower cost disposal could have significant economic advantage. The invention is such a process.

SUMMARY OF THE INVENTION

Accordingly, the invention relates to a process for scrubbing a synthesis gas stream containing residual amounts of iron-containing particulate solids and minor amounts of HCN comprising contacting the synthesis gas stream in a contact or scrubbing zone with an aqueous solution containing a reactant selected from ammonium polysulfide; sodium polysulfide; a compound having the formula

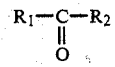

wherein $R_1$ and $R_2$ are hydrogen or alkyl containing 1 through 3 carbon atoms, provided that $R_1$ and $R_2$ are never simultaneously alkyl; precursors thereof, and mixtures of said compounds, precursors, and compounds and precursors; and mixtures thereof, the reactant being supplied in solution in an amount in excess of that required to react stoichiometrically with the HCN in the synthesis gas. A substantially HCN-free synthesis gas stream is produced, and an aqueous mixture containing solids, reaction products of HCN and said reactant, and iron cyanide complex or complexes is removed from the scrubbing zone. If the reactant is a polysulfide or mixture of polysulfides, the contacting of the excess reactant with at least a portion of the mixture is continued in a contact or conversion zone at a temperature of from about 110° C. to about 180° C. The continued low temperature contacting and continued heat treatment converts the iron cyanide complex or complexes present, as described in my copending application Ser. No. 814,709, entitled "Removal Process" filed even date herewith, incorporated by reference. If the reactant is a compound (such as formaldehyde) or mixture of compounds having the formula

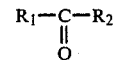

as set out more fully above, a reactant selected from ammonium polysulfide, sodium polysulfide (or mixtures thereof) is added prior to or during the residence of the mixture in the contact or conversion zone. In either case, the iron cyanide complex or complexes in the mixture are converted, and the mixture, having a substantially reduced iron cyanide complex or complexes content or concentration, is suitable for and sent to biological waste treatment. As used herein, the term "iron cyanide complex" or "iron cyanide complexes", or any obvious variant thereof, refers to either of or both the ferrocyanide ion, $[Fe^{II}(CN)_6]^{-4}$, and the ferricyanide ion, $[Fe^{III}(CN)_6]^{-3}$. The reactions, in the case of ammonium polysulfide, may be shown as follows:

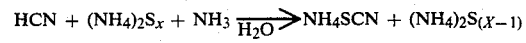

wherein X is a whole number from 2 through 5;

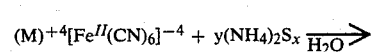

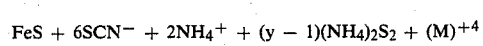

wherein (M) is a metal ion or ions, or $NH_4+$, and x is 3, 4 or 5, and y is 4, 2 and 4/3 respectively, or

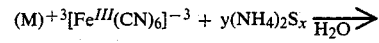

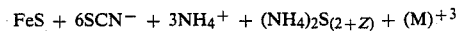

wherein (M) is a metal ion or ions or $NH_4+$ and x is 3, 4 or 5, while y is 4, 2 and 4/3 respectively, and Z is

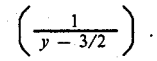

(M) will be any available metal ions or ammonium ion in solution providing the appropriate charge balance, suitable metal ions including the ions of Na, K, Li, Ca, Mg, Al, Sn, etc. Preferably, the total reactant employed for HCN removal is present in an amount which is at least 10 percent greater than that amount which is stoichiometrically equivalent to the HCN in the gas, and preferably at least 50 percent greater.

The particular type of synthesis gas stream treated according to the invention is not critical. However, the invention is particularly applicable to synthesis gas streams from processes in which HCN is present in a minor amount and in which a flyash which contains reduced iron is present. The efficiency of cyclones and other particulates removal units is such that residual or quite minor quantities, e.g., from about 0.1 to about 10 percent by weight, perhaps about 0.5 percent to about 1.0 percent by weight, of the iron-containing flyash or particulates remains in the synthesis gas. HCN may be present from trace amounts up to one percent by volume, but normally be present from about 0.002 percent to about 0.1 percent by volume. Obviously, the more effective the particulates removal, the lesser the cyanide complex or complexes formation and removal requirements. Accordingly, the concentrations of the iron cyanide complex or complexes in the mixtures treated are not critical, and may range from detectable or minimal impurity amounts, e.g., less than about 1 ppm by weight, to the solubility limits of the complex or complexes. Generally, the concentrations will range from about 1 ppm to about 200 ppm, normally about 10 ppm to about 50 ppm, all by weight.

As stated, the scrubbing solution comprises a reactant, as more fully described, supra. The total amount of reactant will normally be an amount sufficient to give the desired level of removal of HCN. The specific amount of reactant will depend on the reactant employed. In the case of a polysulfide or mixture thereof, the reactant will preferably be supplied, with respect to the HCN, in a molar ratio of from less than about 1, up to 10 or even higher, most preferably in a molar ratio of from about 1.1 to about 1.8. If an aldehyde compound of the type mentioned is employed, the aldehyde may preferably be supplied in a molar ratio of less than about 1, to slightly greater than 1.1, based on the HCN. Average contacting time for the gas is several seconds. Average contacting time for the solution, preferably employed in a scrubbing loop, may range from several minutes to several hours, preferably 30 minutes to 2 hours. In general, the scrubbing will be carried out with the reactant concentrations specified and under conditions to convert HCN, as more fully described in the aforementioned Diaz patents and the G. R. Moore application. As described in the aforementioned G. R. Moore application, the scrubbing may be carried out in separate stages by different reactants. The reactant concentrations may be utilized as described therein. In such cases, all or part of the scrubbing solution may be treated, as described herein. Temperatures of the mixture from the scrubbing zone may vary widely, but will preferably range from about 40° C. to about 110° C., preferably from about 80° C. to about 100° C. Pressures of the synthesis gas will depend on the type of process involved, but will preferably range from 5 atmospheres to about 30 atmospheres.

The scrubbing or removal step is preferably carried out continuously, while the continued conversion may be carried out continuously or batchwise. Preferably, a "bleed" of mixture or solution is continuously withdrawn from the scrubbing zone, and sent for continued conversion. Again, the conversion of the iron cyanide complex or complexes is preferably carried out continuously. In such case, the bleed from the scrubbing zone is continuously supplied to the conversion zone, and a portion or "bleed" of mixture having reduced concentration of cyanide complex or complexes is removed from the conversion zone. Whether batch or continuous, the conversion is carried out for a time sufficient to convert at least the bulk of the cyanide complex or complexes present, or to reduce the concentration of the cyanide complex or complexes to the level desired or required. This time may vary with the concentrations and actual temperatures employed. Obviously, longer or shorter residence times may be employed than those suggested hereinafter, it not being intended by the specification of appropriate residence times to limit the invention. In the case of a batch operation, a suitable total reaction or residence time, assuming a well stirred system, may range from a few minutes to several hours, preferably from about 10 minutes to about one hour. In the case of a continuous operation, the conversion is carried out in such a manner that a given portion of solution in passing through the conversion zone has an average residence time as indicated, supra. If the temperatures of the mixture from the scrubbing zone are suitable (or heating may be employed), the time of the mixture bleed spent in the line or lines from the scrubbing zone may be included in total residence time. The total residence time may also include, of course, time spent in the bleed line from the conversion zone. Theoretically, as those skilled in the art will recognize, a "line" may be provided of sufficient length to form the contacting or conversion zone. Turbulent flow reactors may be utilized, or a well stirred vessel is also suitable. The system is preferably closed. Pressures in the conversion zone are not critical, and may range from below atmospheric to 100 atmospheres or more. Preferably, pressures will range from atmospheric to 5 or 10 atmospheres.

As noted, if the reactant is not a polysulfide or mixture thereof, a polysulfide material is supplied to the mixture prior to or during the conversion phase of the invention. The polysulfide will preferably be supplied as a solution, although the polysulfide may be generated in situ in the mixture or solution in the conversion or contact zone by reaction of suitable precursors. The polysulfide solution will preferably have a pH of from about 8 to 10, most preferably from 8.5 to 9.5. The pH of the aqueous mixture treated from the scrubbing zone may be widely variable, but will preferably range from 7 to 11, most preferably 8.5 to 9.5, and may be adjusted to this range, if desired. Concentrations of the polysulfide in a solution supplied to the conversion zone are not critical, but the solution concentrations will preferably range from 0.01 to 1, preferably 0.1 to 0.5 moles of polysulfide per liter. In general, polysulfide solution added will contain at least a stoichiometric amount of the polysulfide sulfur with respect to the iron cyanide complex or complexes, and preferably up to 3 or 4 times the stoichiometric amount. Elemental sulfur may be supplied in the contact or hydrolysis zone to maintain this concentration.

Because the mixture, after the continuous conversion, contains significant volumes of solids at this point, it is preferably treated for their removal before final disposal. Accordingly, the solution may be, e.g., clarified, filtered or centrifuged. The substantially solids free solution may be sent to biological waste treatment, since the products of the reactions described are biologically degradable.

The following experiments were conducted.

EXPERIMENT I

Fifty (50) mililiters of an aqueous slurry of flyash particulates (pH 7.5) containing 15 ppm by weight of iron cyanide complex were heated for 15 minutes at 170° C. in a closed vessel with an amount of ammonium polysulfide which was in stoichiometric excess with respect to the iron cyanide complex. Analysis of the product mixture indicated that thiocyanate ion was produced, but detectable amounts of the iron cyanide complex were not observed.

EXPERIMENT II

In a run similar to Experiment I, fifty (50) milliliters of an aqueous slurry of flyash particulates, at a pH of 9.5, containing 150 ppm by weight of potassium ferricyanide, was heated in a closed vessel for 30 minutes at 160° C. with an amount of ammonium polysulfide which was in stoichiometric excess with respect to the ferricyanide complex. Thiocyanate was produced, and the amount of cyanide complex remaining was below the detectable amount.

EXPERIMENT III

About fifty-five (55) gallons of an aqueous slurry produced from scrubbing of coal-derived gases, at a pH of 8.5, and containing iron cyanide complex and polysulfide from the scrubbing operation, was heated for two hours at temperatures of from 110° C. to 120° C. The resultant iron cyanide complex level was 5 ppm by weight.

EXPERIMENT IV

In an experiment similar to Experiment III, but without polysulfide present, the iron cyanide complex level was determined to be 75 ppm by weight.

What is claimed is:

1. A process for scrubbing a synthesis gas stream containing residual amounts of iron containing particulate solids and minor amounts of HCN comprising
    (a) contacting said synthesis gas stream in a scrubbing zone with an aqueous solution containing a reactant compound having the formula

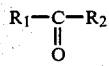

wherein $R_1$ and $R_2$ are hydrogen or alkyl containing 1 through 3 carbon atoms, provided that $R_1$ and $R_2$ are never simultaneously alkyl, precursors thereof, and mixtures of said compounds, precursors, and compounds and precursors, under conditions to convert HCN, the reactant being present in the solution in an amount in excess of that required to react stoichiometrically with the HCN, and producing a substantially HCN-free synthesis gas stream an aqueous mixture containing solids, reaction products of HCN and said reactant, and iron cyanide complex or complexes;
    (b) removing aqueous mixture from the scrubbing zone, and contacting the mixture in a conversion zone with a reactant selected from ammonium polysulfide, sodium polysulfide, and mixtures thereof, the conversion zone being at a temperature of from about 110° C. to about 180° C., and converting iron cyanide complex or complexes in said mixture and producing a mixture having a reduced iron cyanide complex or complexes content.

2. A process for scrubbing a synthesis gas stream containing residual amounts of iron containing particulate solids and minor amounts of HCN comprising
    (a) contacting said synthesis gas stream in a scrubbing zone with an aqueous solution containing a reactant having the formula

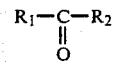

wherein $R_1$ and $R_2$ are hydrogen or alkyl containing 1 through 3 carbon atoms, provided that $R_1$ and $R_2$ are never simultaneously alkyl, precursors thereof, and mixtures of said compounds, precursors, and compounds and precursors; in an amount sufficient to remove at least the bulk of HCN, under conditions to convert HCN, and producing a partially-purified synthesis gas stream having reduced HCN content and a first aqueous mixture containing solids, reaction products of HCN and said reactant, and iron cyanide complex or complexes;
    (b) contacting said partially-purified gas stream in said scrubbing zone with an effective amount of an aqueous solution containing a second reactant selected from ammonium polysulfide, sodium polysulfide, and a mixture of ammonium polysulfide and sodium polysulfide, under conditions to convert HCN, the reactant being present in solution in an amount in excess of that required to react stoichiometrically with the HCN; producing a purified gas stream with a further reduced HCN content; a second aqueous mixture containing reaction products of HCN and said second reactant, and iron cyanide complex or complexes;
    (c) removing and combining the first and second aqueous mixtures from the scrubbing zone, and continuing contact of the second reactant with the combined mixture in a conversion zone, the conversion zone being at a temperature of from about 110° C. to about 180° C., and converting iron cyanide complex or complexes in said mixture and producing a mixture having a reduced iron cyanide complex or complexes content.

* * * * *